United States Patent [19]
Nakamura

[11] Patent Number: 4,595,264
[45] Date of Patent: Jun. 17, 1986

[54] LENS SYSTEM FOR OPTICAL RECORDING TYPE DISKS

[75] Inventor: Toru Nakamura, Tokyo, Japan

[73] Assignee: Olympus Optical Co., Ltd., Tokyo, Japan

[21] Appl. No.: 529,868

[22] Filed: Sep. 7, 1983

[30] Foreign Application Priority Data

Sep. 13, 1982 [JP] Japan ................. 57-158072
Sep. 14, 1982 [JP] Japan ................. 57-158949
Sep. 14, 1982 [JP] Japan ................. 57-158950

[51] Int. Cl.$^4$ ............................... G02B 9/06
[52] U.S. Cl. ........................... 350/480; 350/432
[58] Field of Search ..................... 350/480, 432

[56] References Cited

U.S. PATENT DOCUMENTS 3,014,407 12/1961 Altman ..................... 350/432
4,002,406 1/1977 Sussman ................... 350/432

FOREIGN PATENT DOCUMENTS 55-45084 3/1980 Japan .

Primary Examiner—John K. Corbin
Assistant Examiner—P. M. Dzierzynski
Attorney, Agent, or Firm—Cushman, Darby & Cushman

[57] ABSTRACT

A lens system for optical recording type disks comprising a first and second lenses wherein the first lens is a positive lens and the second lens is a positive lens, the lens system being arranged that at least one of the exit surface of the first lens and respective surfaces of the second lens is formed as an aspherical surface, the lens system being small in size and light in weight and having a long working distance and favorably corrected aberrations.

24 Claims, 29 Drawing Figures

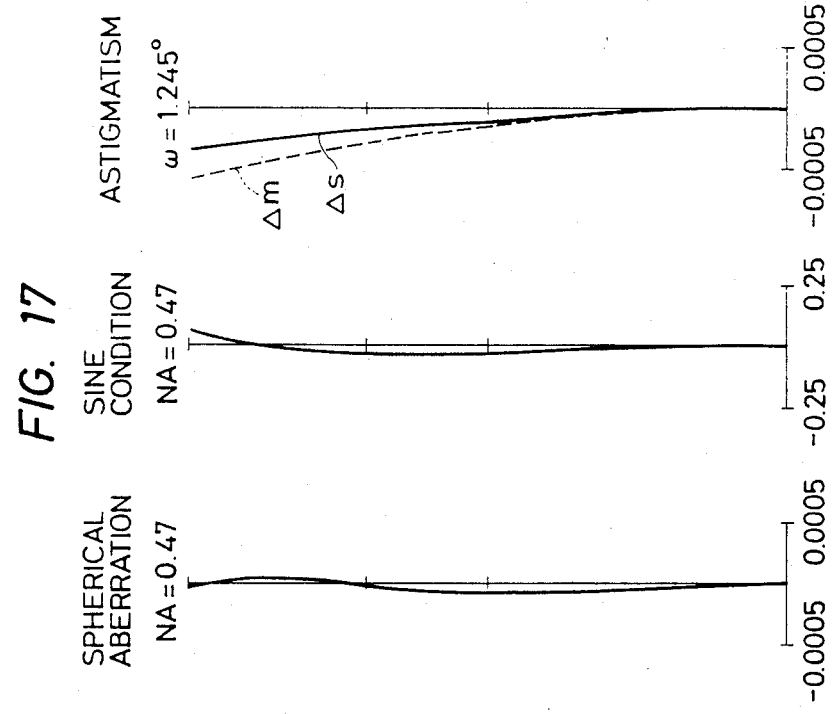
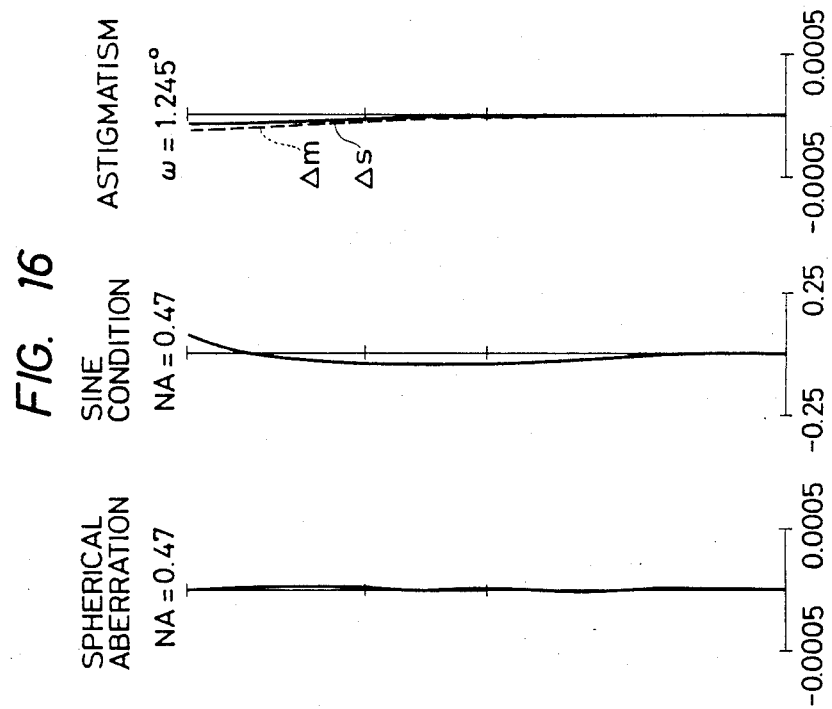

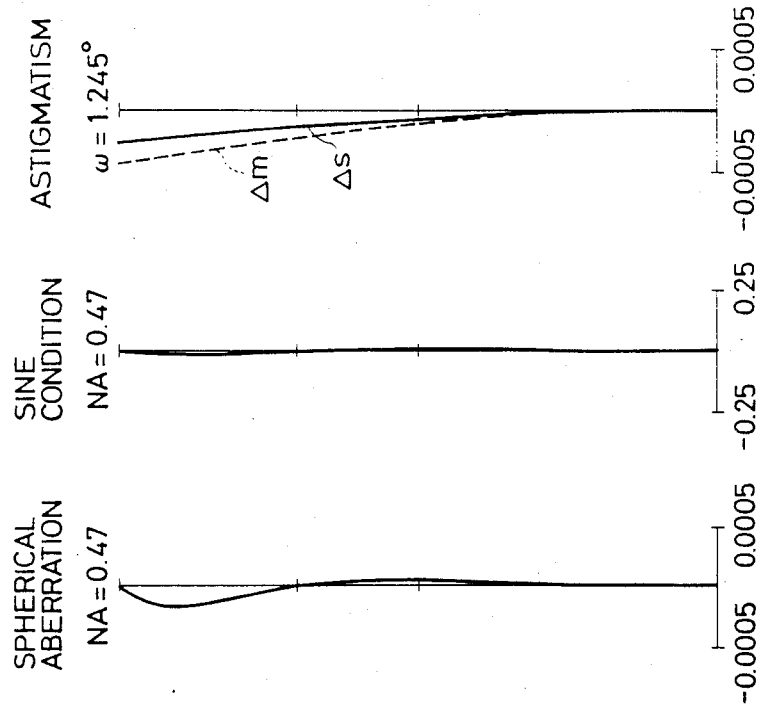
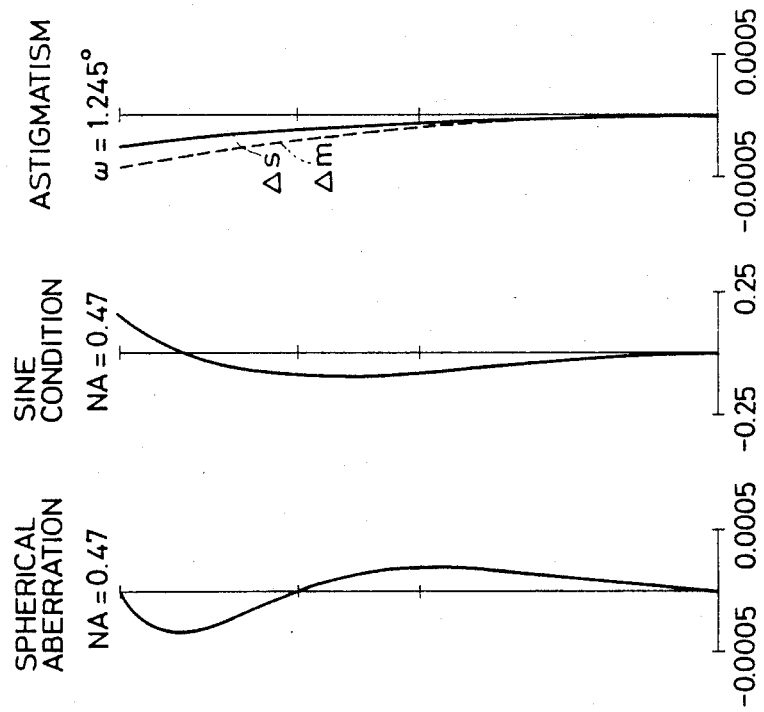

LENS SYSTEM FOR OPTICAL RECORDING TYPE DISKS

BACKGROUND OF THE INVENTION (a) Field of the Invention

The present invention relates to a lens system for optical recording type disks which is small in size and light in weight.

(b) Description of the Prior Art

For a lens system to be used for optical recording type disks, it is necessary to make the resolving power 1μ or less because the lens system is used for reading out the very small signals recorded with high density on the disk. To obtain a lens system with the resolving power of 1μ or less as mentioned in the above, spherical aberration and sine condition should be made as small as possible and, moreover, astigmatism should be also made small. As the automatic tracking method for optical recording type disks, two methods are known, i.e., a method to vibrate the light beam by using a galvanomirror and a method to move the lens system itself in parallel with the disk surface. The lens system for optical recording type disks according to the present invention is to be used for a device for optical recording type disks employing the latter tracking method. Therefore, the lens system should be light in weight and paraxial aberrations thereof should be corrected favourably.

Furthermore, if the lens system for optical recording type disks comes into contact with the disk, the disk and lens system are broken. To prevent the above, the lens system for optical recording type disks should have a long working distance. Besides, for the lens system for optical recording type disks, it is preferable to make the number of lenses constituting the lens system as small as possible.

SUMMARY OF THE INVENTION

It is, therefore, a primary object of the present invention to provide a lens system for optical recording type disks which has an extremely simple lens configuration with an extremely small number of lenses, i.e., two-element lens configuration, and which is arranged that the working distance thereof is long and aberrations thereof are corrected favourably.

To fulfill both of the requirements which are contrary to each other, i.e., the overall length of the lens system should be made short in order to make the working distance long while the overall length of the lens system should be made long to some extent in order to favourably correct astigmatism out of aberrations, the lens system according to the present invention is arranged to have an overall length within a predetermined range and, moreover, at least one of lens surfaces in the lens system is arranged as an aspherical surface, the shape thereof being defined to a predetermined shape, in order to correct spherical aberration and sine condition favourably.

Generally, with a positive lens (thin lens), astigmatism occurs in minus direction and, moreover, meridional astigmatism ($\Delta m$) largely inclines toward minus direction compared with sagittal astigmatism ($\Delta s$). As the lens system according to the present invention comprises two positive lenses, astigmatism especially meriodional astigmatism tends to become a negative value with a large absolute value. To prevent said astigmatism from occurring, thicknesses of respective lenses should be made large.

To make the working distance long, it is preferable to make the overall length of the lens system short as described before. However, when the overall length is made too short, thicknesses of respective lenses should be necessarily made small and astigmatism becomes unfavourable. Therefore, in the present invention, the overall length of the lens system is arranged as an adequate value in order to well balance the requirements to make the working distance long and to correct astigmatism favourably.

Besides, at least one aspherical surface is adopted in the lens system according to the present invention in order to correct aberrations other than astigmatism, especially, spherical aberration and sine condition.

The lens system according to the present invention is arranged to comprise a first lens which is a positive lens and a second lens which is also a positive lens and is arranged that the overall length $\Sigma d$ of the lens system fulfills the condition (1) shown below:

$$0.4 < \Sigma d/f < 0.9 \tag{1}$$

where, reference symbol f represents the focal length of the lens system as a whole.

To make the working distance long for the lens system with the lens configuration as described in the above, the overall length of the lens system should be made short. If, however, the overall length of the lens system is made too short, astigmatic difference increases and this is not desirable for correction of aberrations. The condition (1) is established by taking these points into consideration. If, in the condition (1), $\Sigma d$ becomes larger thatn 0.9f, the working distance (WD) becomes short. If $\Sigma d$ becomes smaller than 0.4f, astigmatic difference increases.

In the lens system according to the present invention, at least one of the exit surface of the first lens, entrance surface of the second lens and exit surface of the second lens is arranged as an aspherical surface which is expressed by the formula shown below.

$$x = \frac{y^2}{r} \Big/ \left( 1 + \sqrt{1 - \left(\frac{y}{r}\right)^2} \right) + Ey^4 + Fy^6 + Gy^8 + \ldots$$

In the formula of aspherical surface shown in the above, reference symbol r represents the radius of curvature of the vertex portion of the aspherical surface, reference symbol x represents the distance from an arbitrary point on the lens surface to the tangential plane which is tangential to said surface at the vertex thereof, reference symbol y represents the distance from said arbitrary point to the optical axis, and reference symbols E, F, G, ... respectively represent coefficients of aspherical surface in the terms of the fourth power, sixth power, eighth power and so forth.

When an aspherical surface expressed by the term of the second power in the formula shown in the above (the term of the fourth power and terms of higher order are all zero) is adopted for at least one of the afore-mentioned exit surface of the first lens and respective surfaces of the second lens, it is possible to correct spherical aberration favourably. However, in that case, the sine condition becomes considerably unfavourable. To correct it, the above-mentioned surface should be formed as an aspherical surface expressed by the terms up to the term of the fourth power or of the sixth power in the formula shown in the above. Especially in case of a lens system arranged to have a short overall length like the lens system according to the present invention, refractive powers of respective lenses should be necessarily made strong. As a result, it becomes difficult to correct aberrations. Therefore, when an aspherical surface expressed by the term of the second power in the above-mentioned formula is used it is not always possible to correct aberrations satisfactorily favourably.

It is possible to obtain a lens system for optical recording type disks which enables to attain the object of the present invention when it is arranged to fulfill the condition (1) and at least one of the exit surface of the first lens and respective surfaces of the second lens is formed as an aspherical surface as described so far.

When, however, the aspherical surface to be used is formed in the shape described below, it is more preferable because it is possible to make aberrations small, especially, it is possible to make bulging of spherical aberration and sine condition small.

When the exit surface of the first lens is arranged as an aspherical surface, it is preferable to form said aspherical surface so that the coefficients of aspherical surface $E_2$ and $F_2$ in the terms of the fourth power and sixth power in the afore-mentioned formula fulfill the conditions (2) and (3) shown below.

$$0.05 < E_2 f^3 < 0.25 \qquad (2)$$

$$-0.05 < F_2 f^5 < 0.1 \qquad (3)$$

When the entrance surface of the second lens is arranged as an aspherical surface, it is preferable to arrange so that the coefficients of aspherical surface $E_3$ and $F_3$ in the terms of the fourth power and sixth power in the formula of aspherical surface showing the shape of said surface fulfill the conditions (2') and (3') shown below.

$$-0.6 < E_3 F^3 < -0.2 \qquad (2')$$

$$-1.2 < F_3 f^5 < 0 \qquad (3')$$

In case that the exit surface of the second lens is arranged as an aspherical surface, it is preferable to form said aspherical surface so that the coefficients of aspherical surface $E_4$ and $F_4$ in the terms of the fourth power and sixth power in said formula fulfill the conditions (2'') and (3'') shown below.

$$0.1 < E_4 f^3 < 0.5 \qquad (2'')$$

$$-0.1 < F_4 f^5 < 0.1 \qquad (3'')$$

If any of the values defined by the above-mentioned conditions becomes larger than the upper limit or smaller than the lower limit of the corresponding condition, it is not desirable because spherical aberration and sine condition cannot be corrected satisfactorily favourably. In other words, it is possible to correct spherical aberration and sine condition satisfactorily favourably by arranging to fulfill the conditions (2) and (3) in case that the exit surface of the first lens is formed as an aspherical surface, the conditions (2') and (3') in case that the entrance surface of the second lens is formed as an aspherical surface, and the conditions (2'') and (3'') in case that the exit surface of the second lens is formed as an aspherical surface.

In the present invention, any one of said three surfaces may be arranged as an aspherical surface described in the above. Alternatively, any two or all of the three surfaces may be arranged as aspherical surfaces.

Furthermore, when the thickness $d_3$ of the second lens is arranged to fulfill the condition (4) shown below, it is possible to obtain a more favourable lens system for optically recording type disks.

$$0.05 < d_3/f < 0.7 \qquad (4)$$

When the value defined by the condition (4) shown in the above becomes larger than the upper limit thereof or smaller than the lower limit thereof, it is difficult to make both of spherical aberration and sine condition small. Besides, when the value defined by the condition (4) becomes larger than the upper limit thereof, the working distance becomes short. When said value becomes smaller than the lower limit of the condition (4), the thickness of the second lens becomes small, and this is not desirable for correction of astigmatism.

BRIEF DESCRIPTION OF THE DRAWINGS

FIGS. 12 through 29 respectively show graphs illustrating aberration curves of Embodiments 1 through 18 of the present invention.

DETAILED DESCRIPTION OF THE PREFERRED EMBODIMENTS

Figure 1:
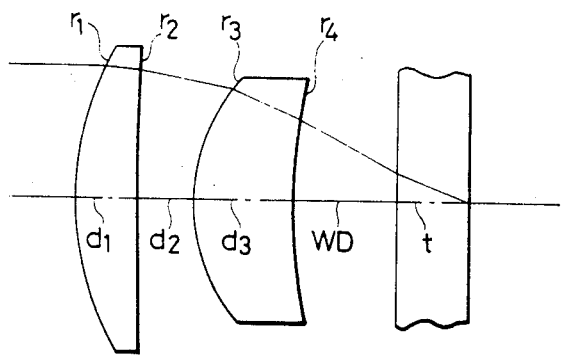
FIGS. 1 through 4 respectively show sectional views of Embodiments 1 through 4 of the lens system for optical recording type disks according to the present invention.

Now, preferred embodiments of the lens system for optical recording type disks according to the present invention described so far are shown below.

EMBODIMENT 1

$r_1 = 1.0371$
 $d_1 = 0.2156$, $n_1 = 1.51032$
$r_2 = 18.2580$ (aspherical surface)
 $d_2 = 0.2197$
$r_3 = 0.6183$
 $d_3 = 0.3607$, $n_2 = 1.51032$
$r_4 = 1.8945$
 $f = 1$, $NA = 0.47$, $\Sigma d = 0.796$, $WD = 0.3774$,
 $E_2 = 0.099487$, $F_2 = 0$

EMBODIMENT 2

$r_1 = 0.8404$ $d_1=0.2391$, $n_1=1.51032$
$r_2=7.4418$ (aspherical surface)
$d_2=0.0652$
$r_3=0.7012$
$d_3=0.2609$, $n_2=1.51032$
$r_4=1.9152$
$f=1$, $NA=0.47$, $\Sigma d=0.5652$, $WD=0.4894$,
$E_2=0.16421$, $F_2=0.0084095$

EMBODIMENT 3

$r_1=1.0979$
$d_1=0.2858$, $n_1=1.4592$
$r_2=-7.6196$ (aspherical surface)
$d_2=0.2083$
$r_3=0.5486$
$d_3=0.2925$, $n_2=1.48224$
$r_4=1.4518$
$f=1$, $NA=0.47$, $\Sigma d=0.7866$, $WD=0.4084$,
$E_2=0.11823$, $F_2=-0.016221$

EMBODIMENT 4

$r_1=0.8196$
$d_1=0.2017$, $n_1=1.76466$
$r_2=3.0950$ (aspherical surface)
$d_2=0.2244$
$r_3=1.9893$
$d_3=0.2840$, $n_2=1.76466$
$r_4=-76.0539$
$f=1$, $NA=0.47$, $\Sigma d=0.7101$, $WD=0.3984$,
$E_2=0.19631$ $F_2=0.031359$

EMBODIMENT 5

$r_1=1.1067$
$d_1=0.2846$, $n_1=1.74289$
$r_2=2.6991$ (aspherical surface)
$d_2=0.1567$
$r_3=0.6455$
$d_3=0.2839$, $n_2=1.51032$
$r_4=4.1012$
$f=1$, $NA=0.47$, $\Sigma d=0.7252$, $WD=0.4454$,
$E_2=0.091788$, $F_2=0.053379$

EMBODIMENT 6

$r_1=1.3173$
$d_1=0.2681$, $n_1=1.89458$
$r_2=2.0058$ (aspherical surface)
$d_2=0.1400$
$r_3=0.7527$
$d_3=0.2600$, $n_2=1.89458$
$r_4=2.0177$
$f=1$, $NA=0.47$, $\Sigma d=0.6681$, $WD=0.5114$,
$E_2=0.053793$, $F_2=0.042449$

EMBODIMENT 7

$r_1=1.2058$
$d_1=0.2581$, $n_1=1.74289$
$r_2=2.1379$ (aspherical surface)
$d_2=0.1410$
$r_3=0.7386$
$d_3=0.2531$, $n_2=1.76466$
$r_4=2.6918$
$f=1$, $NA=0.47$, $\Sigma d=0.6521$, $WD=0.5194$,
$E_2=0.080637$, $F_2=0.065945$

EMBODIMENT 8

$r_1=0.9850$
$d_1=0.2641$, $n_1=1.51032$
$r_2=8.6784$ (aspherical surface)
$d_2=0.1547$
$r_3=0.6303$
$d_3=0.3221$, $n_2=1.48224$
$r_4=2.7315$
$f=1$, $NA=0.47$, $\Sigma d=0.7409$, $WD=0.4224$,
$E_2=0.13141$, $F_2=0.019491$

EMBODIMENT 9

$r_1=0.6919$
$d_1=0.2283$, $n_1=1.46544$
$r_2=1.6766$
$d_2=0.012$
$r_3=0.8735$ (aspherical surface)
$d_3=0.4336$, $n_2=1.45920$
$r_4=-2.6614$
$f=1$, $NA=0.47$, $\Sigma d=0.6739$, $WD=0.4494$,
$E_3=-0.47326$, $F_3=-1.0037$

EMBODIMENT 10

$r_1=0.7814$
$d_1=0.1582$, $n_1=1.89502$
$r_2=1.5206$
$d_2=0.1525$
$r_3=1.7039$ (aspherical surface)
$d_3=0.5090$, $n_2=1.89502$
$r_4=12.2083$
$f=1$, $NA=0.47$, $\Sigma d=0.8196$, $WD=0.3564$,
$E_3=-0.25373$, $F_3=-0.040533$

EMBODIMENT 11

$r_1=0.7382$
$d_1=0.1085$, $n_1=1.65861$
$r_2=1.5773$
$d_2=0.1344$
$r_3=1.2716$ (aspherical surface)
$d_3=0.5357$, $n_2=1.67405$
$r_4=-10.1953$
$f=1$, $NA=0.47$, $\Sigma d=0.7786$, $WD=0.3914$,
$E_3=-0.2937$, $F_3=-0.2420$

EMBODIMENT 12

$r_1=0.7578$
$d_1=0.1002$, $n_1=1.65861$
$r_2=1.2868$
$d_2=0.0887$
$r_3=1.0779$ (aspherical surface)
$d_3=0.5549$, $n_2=1.59253$
$r_4=-3.1499$
$f=1$, $NA=0.47$, $\Sigma d=0.7438$, $WD=0.4294$,
$E_3=-0.3074$, $F_3=-0.3873$

EMBODIMENT 13

$r_1=0.6462$
$d_1=0.0809$, $n_1=1.57157$
$r_2=0.9235$
$d_2=0.1291$
$r_3=0.9367$ (aspherical surface)
$d_3=0.4639$, $n_3=1.59253$
$r_4=-3.1019$
$f=1$, $NA=0.47$, $\Sigma d=0.6739$, $WD=0.4864$,
$E_3=-0.4077$, $F_3=-0.7598$

EMBODIMENT 14

$r_1=1.0065$
$d_1=0.2681$, $n_1=1.76466$
$r_2=1.9150$
$d_2=0.1807$
$r_3=0.6672$ $d_3 = 0.2033$, $n_2 = 1.89502$
$r_4 = 1.1777$ (aspherical surface)
$f = 1$,   $NA = 0.47$,   $\Sigma d = 0.6521$,   $WD = 0.4754$,
$E_4 = 0.17478$, $F_4 = 0$

EMBODIMENT 15

$r_1 = 0.9043$
$d_1 = 0.2594$, $n_1 = 1.76466$
$r_2 = 1.6084$
$d_2 = 0.1666$
$r_3 = 0.6417$
$d_3 = 0.2260$, $n_2 = 1.74289$
$r_4 = 1.2946$ (aspherical surface)
$f = 1$,   $NA = 0.47$,   $\Sigma d = 0.652$,   $WD = 0.4524$,
$E_4 = 0.36266$, $F_4 = 0$

EMBODIMENT 16

$r_1 = 0.9077$
$d_1 = 0.2596$, $n_1 = 1.4592$
$r_2 = 13.3065$
$d_2 = 0.1824$
$r_3 = 0.5202$
$d_3 = 0.12$, $n_2 = 1.48224$
$r_4 = 1.4664$ (aspherical surface)
$f = 1$,   $NA = 0.47$,   $\Sigma d = 0.562$,   $WD = 0.5484$,
$E_4 = 0.3691$, $F_4 = 0.05116$

EMBODIMENT 17

$r_1 = 0.9647$
$d_1 = 0.2619$, $n_1 = 1.57157$
$r_2 = 4.0121$
$d_2 = 0.1863$
$r_3 = 0.5544$
$d_3 = 0.2210$, $n_2 = 1.57157$
$r_4 = 1.1868$ (aspherical surface)
$f = 1$,   $NA = 0.47$,   $\Sigma d = 0.6693$,   $WD = 0.4564$,
$E_4 = 0.39454$, $F_4 = 0.050261$

EMBODIMENT 18

$r_1 = 0.9754$
$d_1 = 0.3806$, $n_1 = 1.51032$
$r_2 = 6.2192$
$d_2 = 0.2676$
$r_3 = 0.4665$
$d_3 = 0.1280$, $n_2 = 1.51032$
$r_4 = 1.2122$ (aspherical surface)
$f = 1$,   $NA = 0.47$,   $\Sigma d = 0.776$,   $WD = 0.4564$,
$E_4 = 0.4752$, $F_4 = 0.05427$ In embodiments shown in the above, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of the first and second lenses for the light with the wavelength $\lambda = 800$ nm.

These Embodiments are used in the state that parallel rays enter them from the first lens side. Besides, a cover glass with the thickness $t = 0.2609$ and refractive index $n_t = 1.48821$ for the wavelength $\lambda = 800$ nm is arranged in rear of the second lens at a distance equal to WD.

Most lens systems for optical recording type discs have been designed such that their actual focal lengths are numerical values other than 1 mm. Of course, some of the lens systems do have actual focal lengths of just 1 mm. The actual focal lengths of most systems put to practical use are about 3 mm–4 mm. The actual focal length of the embodiments of the present invention are 4.6 mm.

Figure 2:
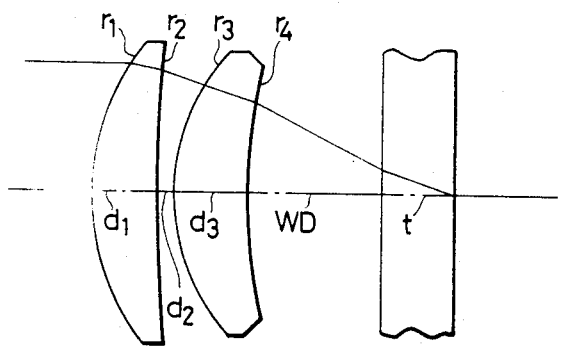
Figure 3:
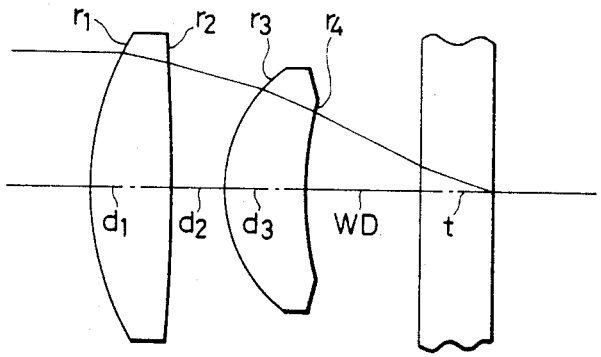
Figure 4:
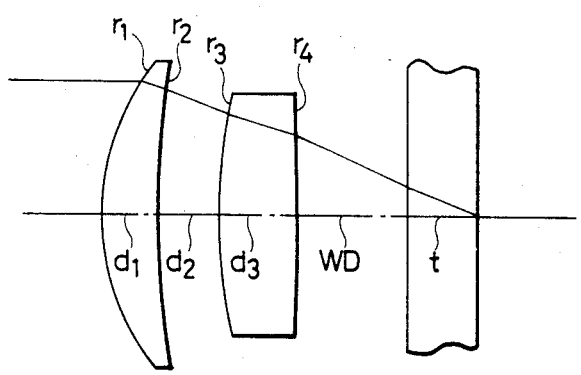
Figure 5:
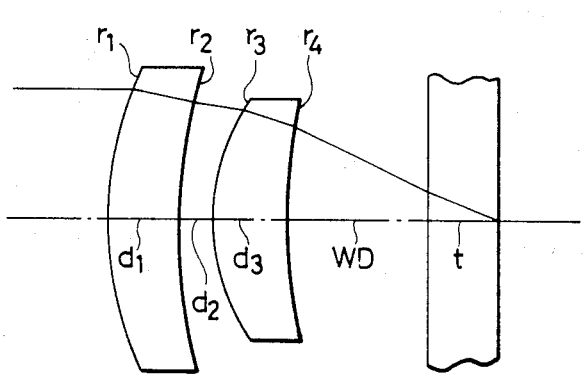
FIG. 5 shows a sectional view of Embodiments 5 through 8 of the lens system according to the present invention.
Figure 6:
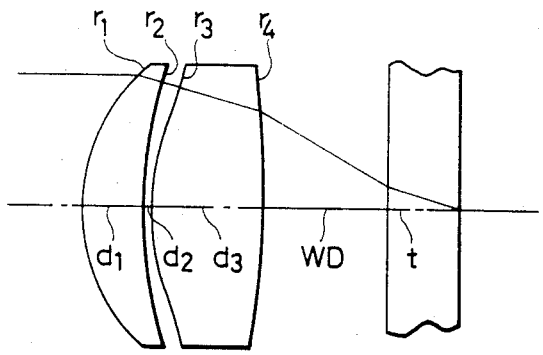
FIG. 6 shows a sectional view of Embodiment 9 of the present invention.
Figure 7:
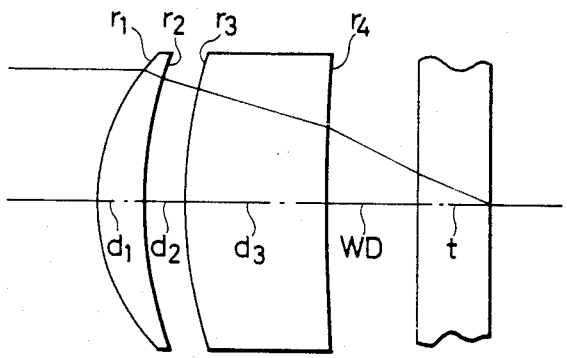
FIG. 7 shows a sectional view of Embodiment 10 of the present invention.
Figure 8:
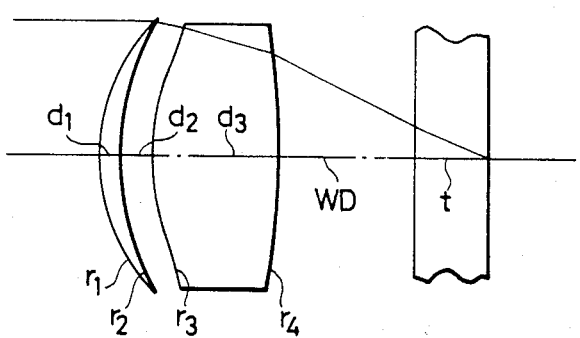
FIG. 8 shows a sectional view of Embodiments 11 through 13 of the present invention.
Figure 9:
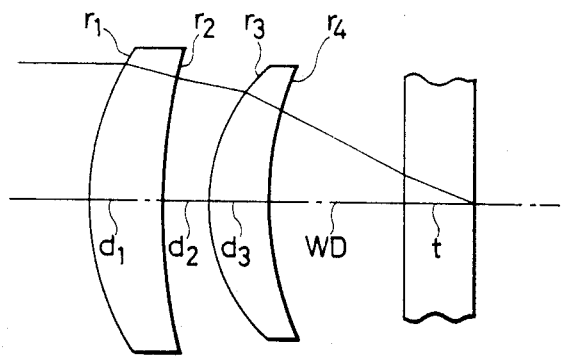
FIG. 9 shows a sectional view of Embodiments 14 through 16 of the present invention.
Figure 10:
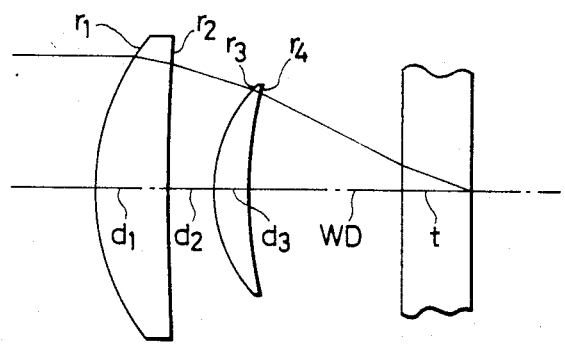
FIG. 10 shows a sectional view of Embodiment 17 of the present invention.
Figure 11:
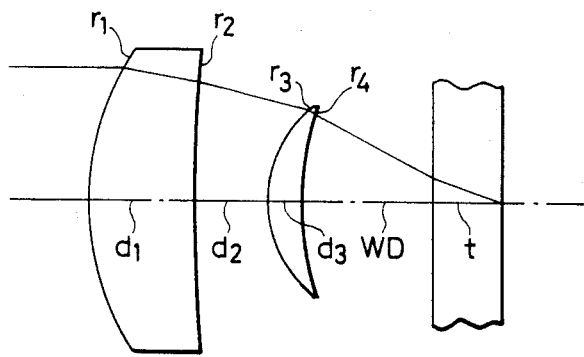
FIG. 11 shows a sectional view of Embodiment 18 of the present invention.
Figure 13:
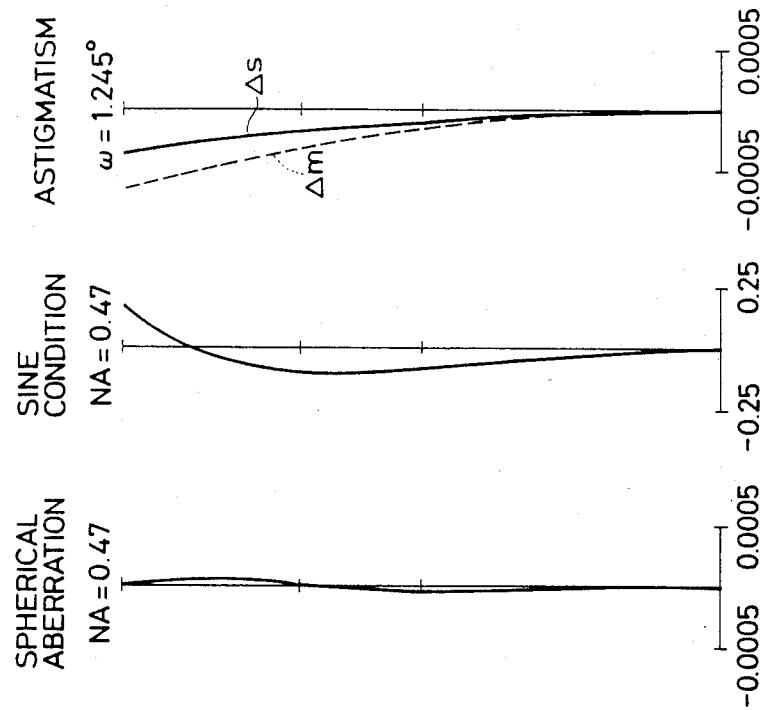
Figure 12:
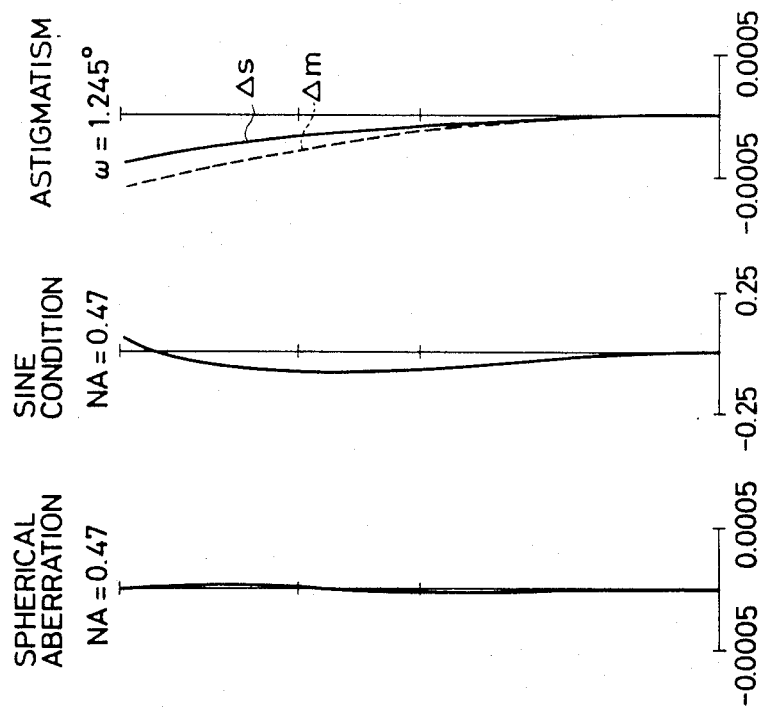
Figure 15:
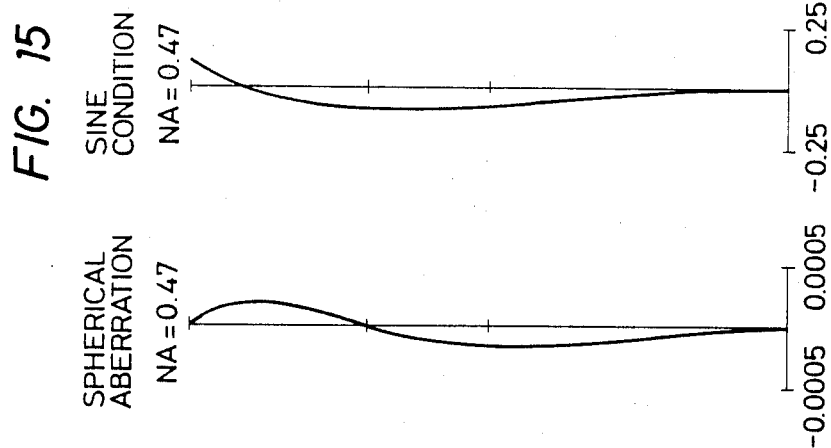
Figure 14:
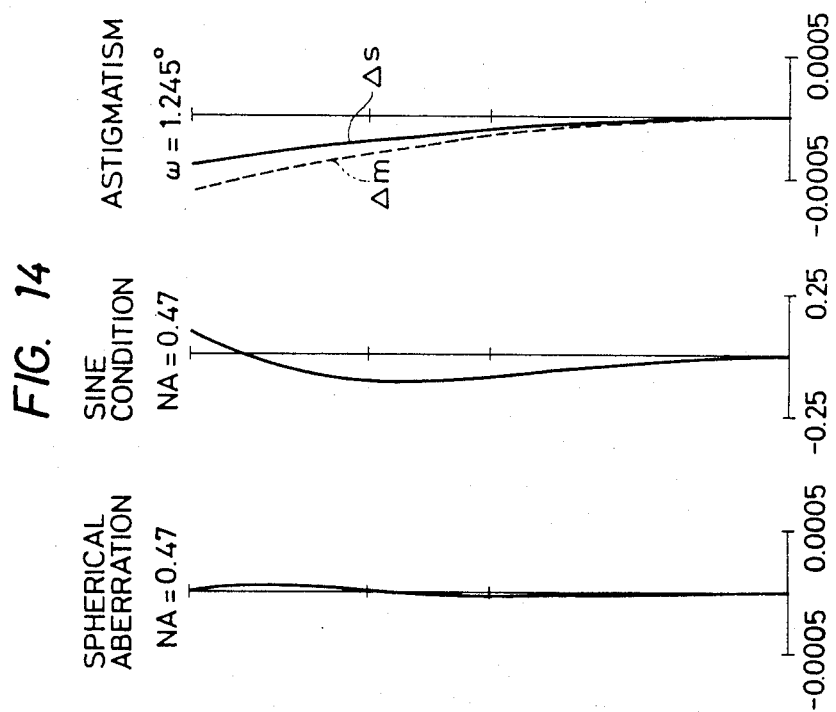
Figure 19:
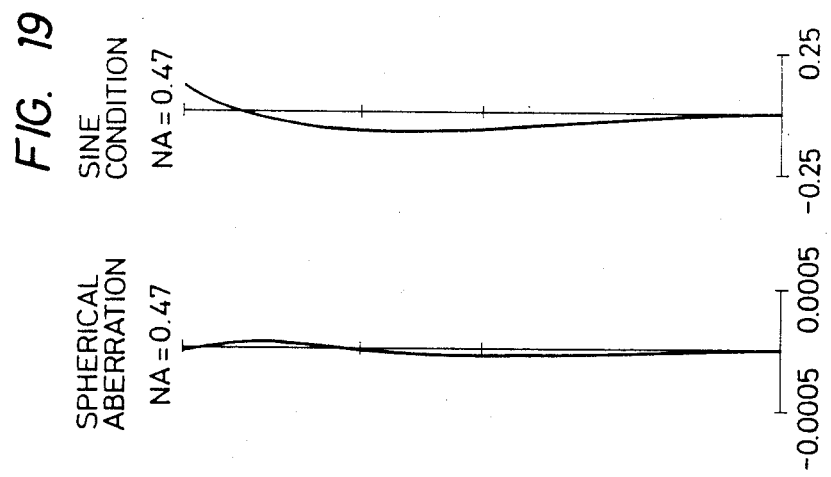
Figure 18:
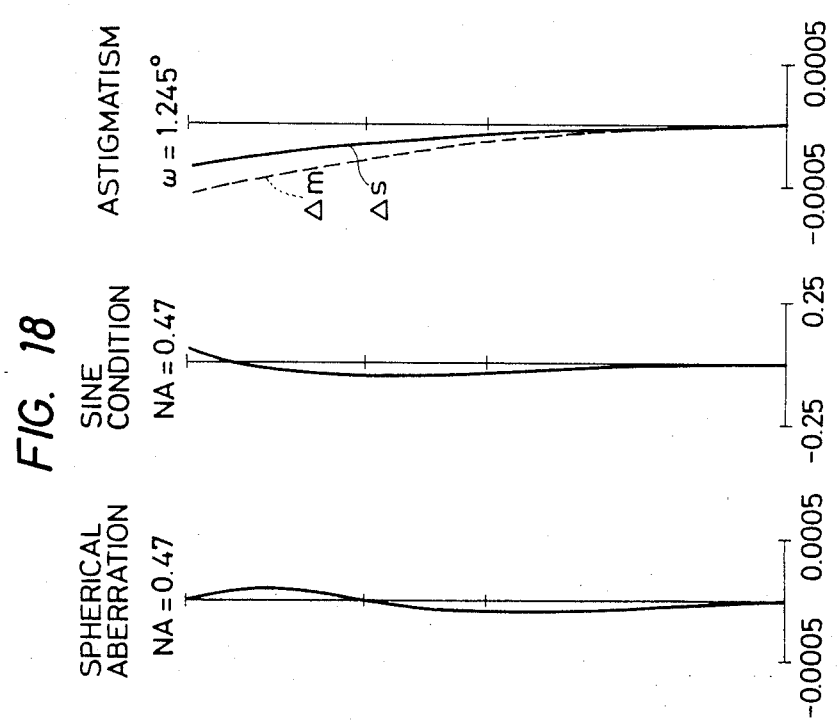
Figure 21:
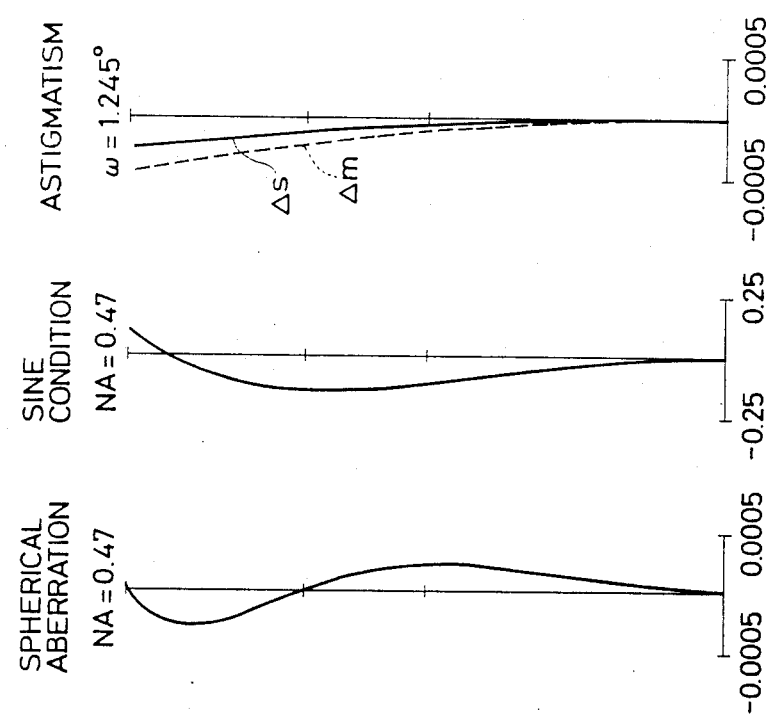
Figure 20:
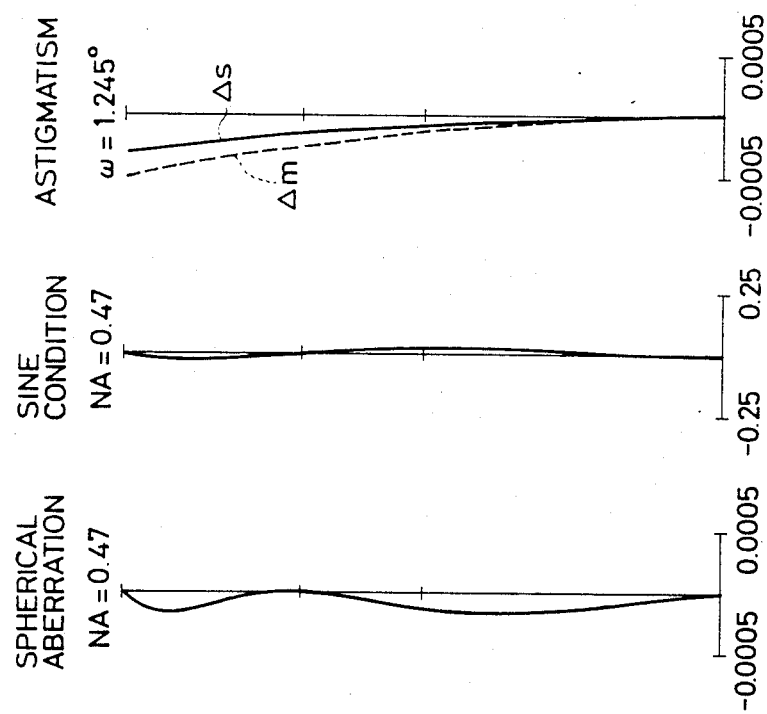
Figure 25:
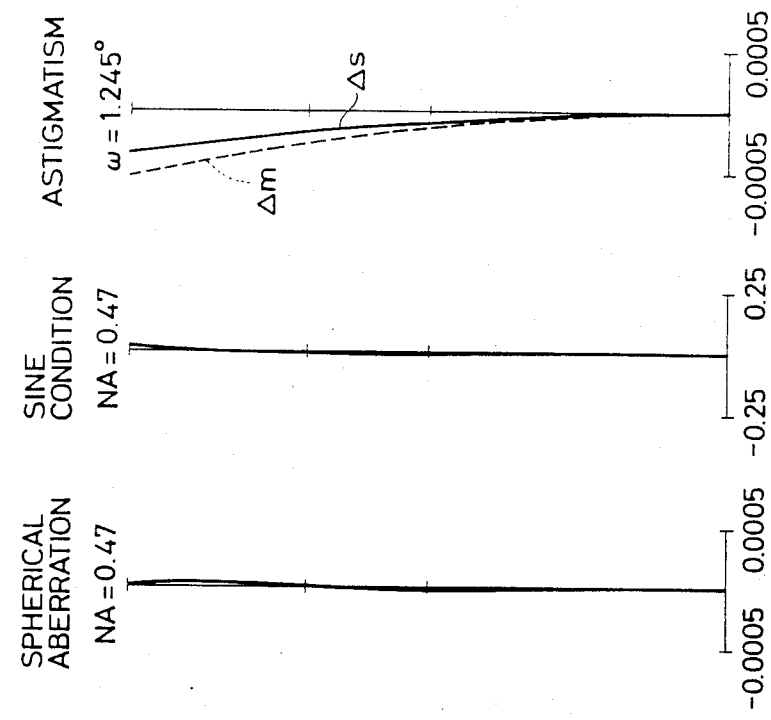
Figure 24:
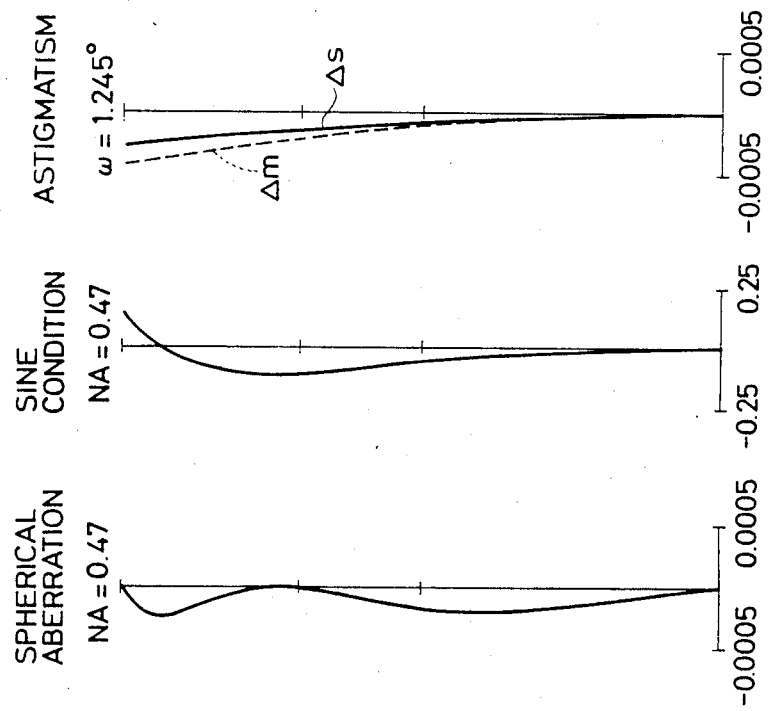
Figure 26:
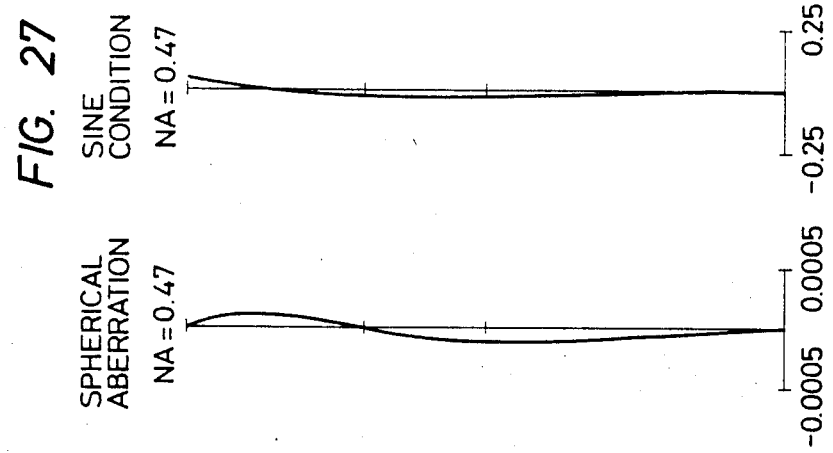
Figure 27:
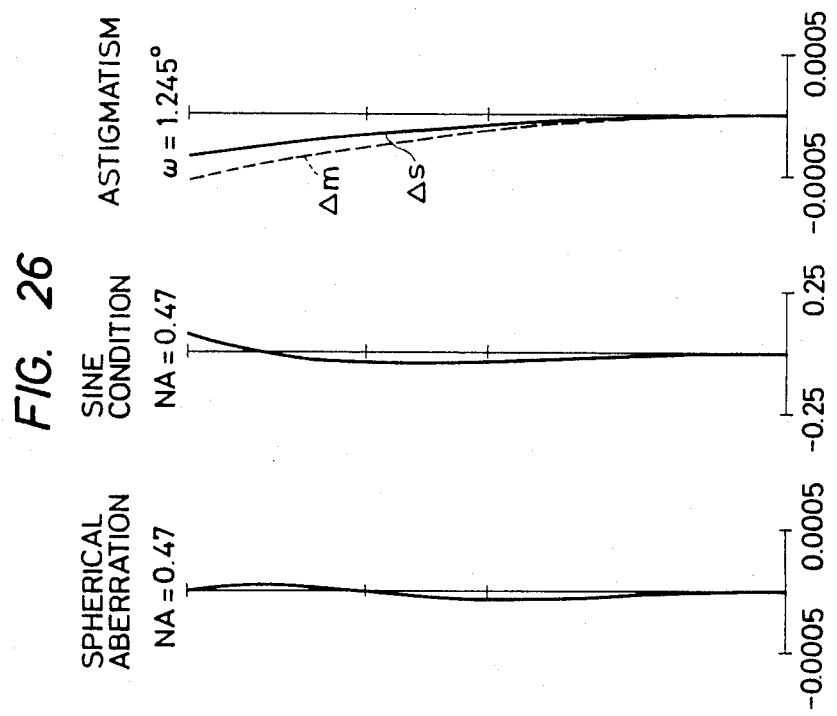
Figure 29:
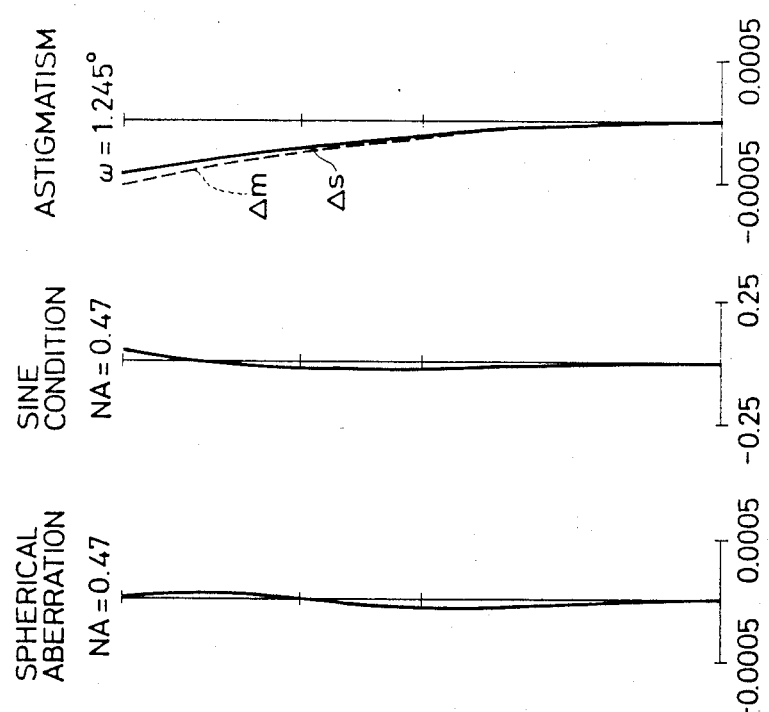
Figure 28:
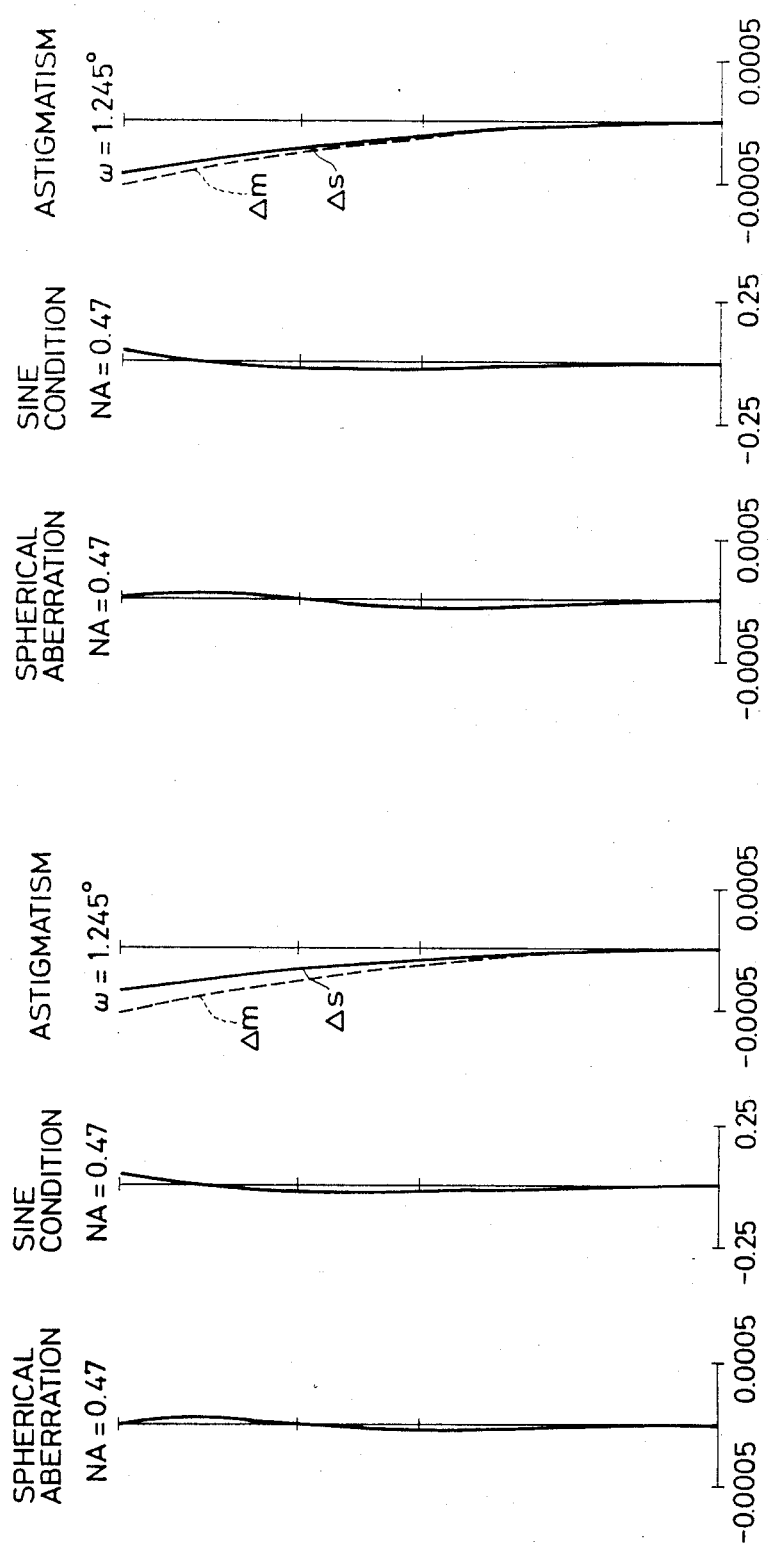

Out of respective embodiments shown in the above, Embodiments 1 through 8 are arranged that the surface on the exit side of the first lens is formed as an aspherical surface. Therefore, the coefficients of aspherical surface $E_2$ and $F_2$ of these aspherical surfaces are arranged to have values that fulfill the conditions (2) and (3). Out of these embodiments, Embodiment 1 has the lens configuration shown in FIG. 1. Embodiment 2 has the lens configuration shown in FIG. 2 and is arranged that the overall length is especially short. Embodiment 3 has the lens configuration shown in FIG. 3 and glass materials with low refractive indices are used. Embodiment 4 has the lens configuration shown in FIG. 4. Embodiment 5 through 8 have the lens configuration shown in FIG. 5. Out of them, Embodiment 6 is designed by using glass materials with high refractive indices, and Embodiment 7 is arranged that the working distance is especially long. Embodiments 9 through 13 are arranged that the surface on the entrance side of the second lens is formed as an aspherical surface having the shape that the coefficients of aspherical surface $E_3$ and $F_3$ fulfill the conditions (2') and (3'). Out of them, Embodiment 9 has the lens configuration shown in FIG. 6 and glass materials with low refractive indices are used. Embodiment 10 has the lens configuration shown in FIG. 7 and glass materials with high refractive indices are used. Embodiments 11 through 13 have the lens configuration shown in FIG. 8. Embodiments 14 through 18 are arranged that the surface on the exit side of the second lens is formed as an aspherical surface. The coefficients of aspherical surface $E_4$ and $F_4$ of these aspherical surfaces are selected so as to fulfill the conditions (2") and (3"). Out of them, Embodiments 14 through 16 have the lens configuration shown in FIG. 9. Embodiment 14 is designed by using glass materials with high refractive indices while Embodiment 16 is designed by using glass materials with low refractive indices. Embodiment 17 has the lens configuration shown in FIG. 10 and Embodiment 18 has the lens configuration shown in FIG. 11.

I claim:

1. A lens system for optical recording type disks comprising first and second lenses wherein said first lens is a positive lens and said second lens is a positive lens, said lens system being arranged such that at least one of the surfaces, including the surface on the exit side of said first lens, the surface on the entrance side of said second lens, and the surface on the exit side of said second lens is formed as an aspherical surface arranged such that the vertex portion thereof is approximated by a spherical surface, said lens system being arranged to fulfill the condition (1) shown below:

$$0.4 < \Sigma d/f < 0.9 \quad (1)$$

where reference symbol f represents the focal length of the lens system as a whole and reference symbol $\Sigma d$ represents the overall length of the lens system, and in which the surface on the exit side of said first lens is formed as an aspherical surface expressed by the formula of aspherical surface shown below wherein reference symbol r represents the radius of curvature of said vertex portion of said aspherical surface, reference symbol x represents the distance from an arbitrary point on said aspherical surface to the tangential plane which is tangential to said surface at the vertex thereof, and reference symbol y represents the distance from said arbitrary point to the optical axis, said lens system being arranged to further fulfill the conditions (2) and (3) shown below:

$$x = \frac{\frac{y^2}{r}}{1 + \sqrt{1 - \left(\frac{y}{r}\right)^2}} + E_2 y^4 + F_2 y^6 + G_2 y^8 + \ldots$$

$$0.05 < E_2 f^3 < 0.25 \quad (2)$$

$$-0.05 < F_2 f^5 < 0.1 \quad (3)$$

where, reference symbols $E_2, F_2, G_2, \ldots$ respectively represent coefficients of aspherical surface.

2. A lens system for optical recording type disks according to claim 1 further fulfilling the condition (4) shown below:

$$0.05 < d_3/f < 0.7 \quad (4)$$

where, reference symbol $d_3$ represents the thickness of the second lens.

3. A lens system for optical recording type disks according to claim 1 in which said lens system has the following numerical data:

$r_1 = 1.0371$
  $d_1 = 0.2156, n_1 = 1.51032$
$r_2 = 18.2580$ (aspherical surface)
  $d_2 = 0.2197$
$r_3 = 0.6183$
  $d_3 = 0.3607, n_2 = 1.51032$
$r_4 = 1.8945$
  $f = 1, \quad NA = 0.47, \quad \Sigma d = 0.796, \quad WD = 0.3774,$
  $E_2 = 0.099487, F_2 = 0$ where, reference symbols $r_1, r_2, r_3$ and $r_4$ respectively represent radii of curvature of respective lens surfaces, reference symbols $d_1, d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

4. A lens system for optical recording type disks according to claim 1, in which said lens system has the following numerical data:

$r_1 = 0.8404$
  $d_1 = 0.2391, n_1 = 1.51032$
$r_2 = 7.4418$ (aspherical surface)
  $d_2 = 0.0652$
$r_3 = 0.7012$
  $d_3 = 0.2609, n_2 = 1.51032$
$r_4 = 1.9152$
  $f = 1, \quad NA = 0.47, \quad \Sigma d = 0.5652, \quad WD = 0.4894,$
  $E_2 = 0.16421, F_2 = 0.0084095$ where, reference symbols $r_1, r_2, r_3$ and $r_4$ respectively represent radii of curvature of respective lens surfaces, reference symbols $d_1, d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

5. A lens system for optical recording type disks according to claim 1, in which said lens system has the following numerical data:

$r_1 = 1.0979$
  $d_1 = 0.2858, n_1 = 1.4592$
$r_2 = -7.6196$ (aspherical data)
  $d_2 = 0.2083$
$r_3 = 0.5486$
  $d_3 = 0.2925, n_2 = 1.48224$
$r_4 = 1.4518$
  $f = 1, \quad NA = 0.47, \quad \Sigma d = 0.7866, \quad WD = 0.4084,$
  $E_2 = 0.11823, F_2 = -0.016221$ where, reference symbols $r_1, r_2, r_3$ and $r_4$ respectively represent radii of curvature of respective lens surfaces, reference symbols $d_1, d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

6. A lens system for optical recording type disks according to claim 1, in which said lens system has the following numerical data:

$r_1 = 0.8196$
  $d_1 = 0.2017, n_1 = 1.76466$
$r_2 = 3.0950$ (aspherical surface)
  $d_2 = 0.2244$
$r_3 = 1.9893$
  $d_3 = 0.2840, n_2 = 1.76466$
$r_4 = -76.0539$
  $f = 1, \quad NA = 0.47, \quad \Sigma d = 0.7101 \quad WD = 0.3984,$
  $E_2 = 0.19631, F_2 = 0.031359$ where, reference symbols $r_1, r_2, r_3$ and $r_4$ respectively represent radii of curvature of respective lens surfaces, reference symbols $d_1, d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

7. A lens system for optical recording type disks accroding to claim 1, in which said lens system has the following numerical data:

$r_1 = 1.1067$
  $d_1 = 0.2846, n_1 = 1.74289$
$r_2 = 2.6991$ (aspherical surface)
  $d_2 = 0.1567$
$r_3 = 0.6455$
  $d_3 = 0.2839, n_2 = 1.51032$
$r_4 = 4.1012$
  $f = 1, \quad NA = 0.47, \quad \Sigma d = 0.7252, \quad WD = 0.4454,$
  $E_2 = 0.091788, F_2 = 0.053379$ where, reference symbols $r_1, r_2, r_3$ and $r_4$ respectively represent radii of curvature of respective lens surfaces, reference symbols $d_1, d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

8. A lens system for optical recording type disks according to claim 1, in which said lens system has the following numerical data:

$r_1 = 1.3173$
  $d_1 = 0.2681, n_1 = 1.89458$
$r_2 = 2.0058$ (aspherical surface)
  $d_2 = 0.1400$
$r_3 = 0.7527$
  $d_3 = 0.2600, n_2 = 1.89458$
$r_4 = 2.0177$
  $f = 1, \quad NA = 0.47, \quad \Sigma d = 0.6681 \quad WD = 0.5114,$
  $E_2 = 0.053793, F_2 = 0.042449$ where, reference symbols $r_1, r_2, r_3$ and $r_4$ respectively represent radii of curvature of respective lens surfaces, reference symbols $d_1, d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ mn.

9. A lnes system for optical recording type disks according to claim 1, in which said lens system has the following numerical data:

$r_1 = 1.2058$
  $d_1 = 0.2581$, $n_1 = 1.74289$
$r_2 = 2.1379$ (aspherical surface)
  $d_2 = 0.1410$
$r_3 = 0.7386$
  $d_3 = 0.2531$, $n_2 = 1.76466$
$r_4 = 2.6918$
  $f = 1$,   $NA = 0.47$,   $\Sigma d = 0.6521$   $WD = 0.5194$,
    $E_2 = 0.080637$, $F_2 = 0.065945$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

10. A lens system for optical recording type disks according to claim 1, in which said lens system has the following numerical data:

$r_1 = 0.9850$
  $d_1 = 0.2641$, $n_1 = 1.51032$
$r_2 = 8.6784$ (aspherical surface)
  $d_2 = 0.1547$
$r_3 = 0.6303$
  $d_3 = 0.3221$, $n_2 = 1.48224$
$r_4 = 2.7315$
  $f = 1$,   $NA = 0.47$,   $\Sigma d = 0.7409$   $WD = 0.4224$,
    $E_2 = 0.13141$, $F_2 = 0.019491$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

11. A lens system for optical recording type disks comprising first and second lenses wherein said first lens is a positive lens and said second lens is a positive lens, said lens system being arranged that at least one of the surfaces, including the surface on the exit side of said first lens, the surface on the entrance side of said second lens, or the surface on the exit side of said second lens is formed as an aspherical surface arranged that the vertex portion thereof is approximated by a spherical surface, said lens system being arranged to fulfill the condition (1) shown below:

$$0.4 < \Sigma d/f < 0.9 \qquad (1)$$

where, reference symbol f represents the focal length of the lens system as a whole and reference symbol $\Sigma d$ represents the overall length of the lens system, and in which the surface on the entrance side of said second lens is formed as an aspherical surface expressed by the formula of aspherical surface shown below wherein reference symbol r represents the radius of curvature of said vertex portion of said aspherical surface, reference symbol x represents the distance from an arbitrary point on said aspherical surface to the tangential plane which is tangential to said surface at the vertex thereof, and reference symbol y represents the distance from said arbitrary point to the optical axis, said lens system being arranged to further fulfill the conditions (2') and (3') shown below:

$$x = \frac{\frac{y^2}{r}}{1 + \sqrt{1 - \left(\frac{y}{r}\right)^2}} + E_3 y^4 + F_3 y^6 + G_3 y^8 + \ldots$$

$$-0.6 < E_3 f^3 < -0.2 \qquad (2')$$

$$-1.2 < F_3 f^5 < 0 \qquad (3')$$

where, reference symbols $E_3$, $F_3$, $G_3$, ... respectively represent coefficients of aspherical surface.

12. A lens system for optical recording type disks according to claim 11 further fulfilling the condition (4) shown below:

$$0.05 < d_3/f < 0.7 \qquad (4)$$

where, reference symbol $d_3$ represents the thickness of the second lens.

13. A lens system for optical recording type disks according to claim 11, in which said lens system has the following numerical data:

$r_1 = 0.6919$
  $d_1 = 0.2283$, $n_1 = 1.46544$
$r_2 = 1.6766$
  $d_2 = 0.012$
$r_3 = 0.8735$ (aspherical surface)
  $d_3 = 0.4336$, $n_2 = 1.45920$
$r_4 = -2.6614$
  $f = 1$,   $NA = 0.47$,   $\Sigma d = 0.6739$,   $WD = 0.4494$,
    $E_3 = -0.47326$, $F_3 = -1.0037$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

14. A lens system for optical recording type disks according to claim 11, in which said lens system has the following numerical data:

$r_1 = 0.7814$
  $d_1 = 0.1582$, $n_1 1.89502$
$r_2 = 1.5206$
  $d_2 = 0.1525$
$r_3 = 1.7039$ (aspherical surface)
  $d_3 = 0.5090$, $n_2 = 1.89502$
$r_4 = 12.2083$
  $f = 1$,   $NA = 0.47$,   $\Sigma d = 0.8196$,   $WD = 0.3564$,
    $E_3 = -0.25373$, $F_3 = -0.040533$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

15. A lens system for optical recording type disks according to claim 11, in which said lens system has the following numerical data:

$r_1 = 0.7382$
  $d_1 = 0.1085$, $n_1 = 1.65861$
$r_2 = 1.5773$
  $d_2 = 0.1344$ $r_3 = 1.2716$ (aspherical surface)
$d_3 = 0.5357$, $n_2 = 1.67405$
$r_4 = -10.1953$
$f = 1$, $NA = 0.47$, $\Sigma d = 0.7786$, $WD = 0.3914$,
$E_3 = -0.2937$, $F_3 = -0.2420$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

16. A lens system for optical recording type disks according to claim 11, in which said lens system has the following numerical data:

$r_1 = 0.7578$
$d_1 = 0.1002$, $n_1 = 1.65861$
$r_2 = 1.2868$
$d_2 = 0.0887$
$r_3 = 1.0779$ (aspherical surface)
$d_3 = 0.5549$, $n_2 = 1.59253$
$r_4 = -3.1499$
$f = 1$, $NA = 0.47$, $\Sigma d = 0.7438$, $WD = 0.4294$,
$E_3 = -0.3074$, $F_3 = -0.3873$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

17. A lens system for optical recording type disks according to claim 11, in which said lens system has the following numerical data:

$r_1 = 0.6462$
$d_1 = 0.0809$, $n_1 = 1.57157$
$r_2 = 0.9235$
$d_2 = 0.1291$
$r_3 = 0.9367$ (aspherical surface)
$d_3 = 0.4639$, $n_2 = 1.59253$
$r_4 = -3.1019$
$f = 1$, $NA = 0.47$, $\Sigma d = 0.6739$, $WD = 0.4864$,
$E_3 = -0.4077$, $F_3 = -0.7598$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\alpha = 800$ nm.

18. A lens system for optical recording type disks comprising first and second lenses wherein said first lens is a positive lens and said second lens is a positive lens, said lens system being arranged that at least one of the surfaces, including the surface on the exit side of said first lens, the surface on the entrance side of said second lens or the surface on the exit side of said second lens is formed as an aspherical surface arranged that the vertex portion thereof is approximated by a spherical surface, said lens system being arranged to fulfill the condition (1) shown below:

$$0.4 < \Sigma d/f < 0.9 \quad (1)$$

where, reference symbol f represents the focal length of the lens system as a whole and reference symbol $\Sigma d$ represents the overall length of the lens system, and in which the surface on the exit side of said second lens is formed as an aspherical surface expressed by the formula of aspherical surface shown below wherein reference symbol r represents the radius of curvature of said vertex portion of said aspherical surface, reference symbol x represents the distance from an arbitrary point on said aspherical surface to the tangential plane which is tangential to said surface at the vertex thereof, and reference symbol y represents the distance from said arbitrary point to the optical axis, said lens system being arranged to further fulfill the conditions (2'') and (3'') shown below:

$$X = \frac{\frac{y^2}{r}}{1 + \sqrt{1 - \left(\frac{y}{r}\right)^2}} + E_4 y^4 + F_4 y^6 + G_4 y^8 + \ldots$$

$$0.1 < E_4 f^3 < 0.5 \quad (2'')$$

$$-0.1 < F_4 f^5 < 0.1 \quad (3'')$$

where, reference symbols $E_4$, $F_4$, $G_4$, ... respectively represent coefficients of aspherical surface.

19. A lens system for optical recording type disks according to claim 18 further fulfilling the condition (4) shown below:

$$0.05 < d_3/f < 0.7 \quad (4)$$

where, reference symbol $d_3$ represents the thickness of the second lens.

20. A lens system for optical recording type disks according to claim 18, in which said lens system has the following numerical data:

$r_1 = 1.0065$
$d_1 = 0.2681$, $n_1 = 1.76466$
$r_2 = 1.9150$
$d_2 = 0.1807$
$r_3 = 0.6672$
$d_3 = 0.2033$, $n_2 = 1.89502$
$r_4 = 1.1777$ (aspherical surface)
$f = 1$, $NA = 0.47$, $\Sigma d = 0.6521$, $WD = 0.4754$,
$E_4 = 0.17478$, $F_4 = 0$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

21. A lens system for optical recording type disks according to claim 18, in which said lens system has the following numerical data:

$r_1 = 0.9043$
$d_1 = 0.2594$, $n_1 = 1.76466$
$r_2 = 1.6084$
$d_2 = 0.1666$
$r_3 = 0.6417$
$d_3 = 0.2260$, $n_2 = 1.74289$
$r_4 = 1.2946$ (aspherical surface)
$f = 1$, $NA = 0.47$, $\Sigma d = 0.652$, $WD = 0.4524$,
$E_4 = 0.36266$, $F_4 = 0$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

22. A lens system for optical recording type disks according to claim 18, in which said lens system has the following numerical data:

$r_1 = 0.9077$
  $d_1 = 0.2596$, $n_1 = 1.4592$
$r_2 = 13.3065$
  $d_2 = 0.1824$
$r_3 = 0.5202$
  $d_3 = 0.12$, $n_2 = 1.48224$
$r_4 = 1.4664$ (aspherical surface)
  $f = 1$, NA $= 0.47$, $\Sigma d = 0.562$, WD $= 0.5484$,
  $E_4 = 0.3691$, $F_4 = 0.05116$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of responsive lenses for the wavelength $\lambda = 800$ nm.

23. A lens system for optical recording type disks according to claim 18, in which said lens system has the following numeral data:

$r_1 = 0.9647$
  $d_1 = 0.2619$, $n_1 = 1.57157$
$r_2 = 4.0121$
  $d_2 = 0.1863$
$r_3 = 0.5544$
  $d_3 = 0.2210$, $n_2 = 1.57157$
$r_4 = 1.1868$ (aspherical surface)
  $f = 1$, NA $= 0.47$, $\Sigma d = 0.6693$ WD $= 0.4564$,
  $E_4 = 0.39454$, $F_4 = 0.050261$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively respresent refractive indices of respective lenses for the wavelength $\lambda = 800$ nm.

24. A lens system for optical recording type disks according to claim 18, in which said lens system has the following numerical data:

$r_1 = 0.9754$
  $d_1 = 0.3806$, $n_1 = 1.51032$
$r_2 = 6.2192$
  $d_2 = 0.2676$
$r_3 = 0.4665$
  $d_3 = 0.1280$, $n_2 = 1.51032$
$r_4 = 1.2122$ (aspherical surface)
  $f = 1$, NA $= 0.47$, $\Sigma d = 0.776$, WD $= 0.4564$,
  $E_4 = 0.4752$, $F_4 = 0.05427$ where, reference symbols $r_1$, $r_2$, $r_3$ and $r_4$ respectively represent radii of curvature of respective lens surfaces, reference symbols $d_1$, $d_2$ and $d_3$ respectively represent thicknesses of respective lenses and airspace between respective lenses, and reference symbols $n_1$ and $n_2$ respectively represent refractive indices of respective lenses for the wavelength $\lambda = 800$ nm.

* * * * *